Oct. 14, 1969     MITSUO INOUE ET AL     3,472,168
AUTOMATIC SUBMERSIBLE PUMP
Filed March 26, 1968
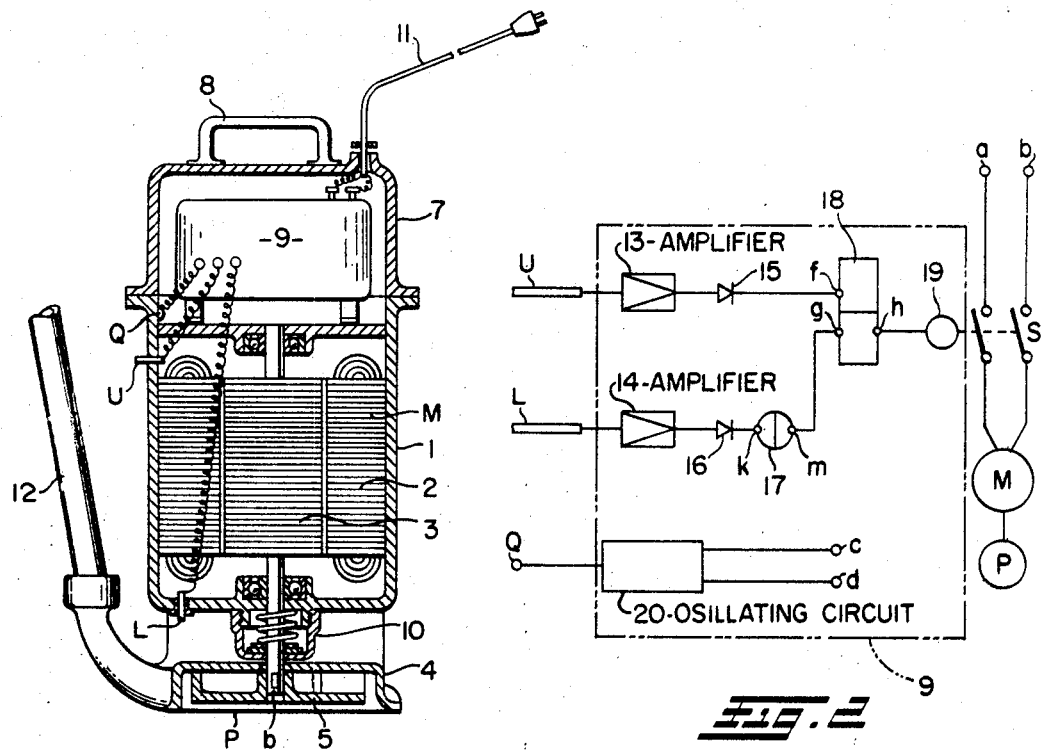
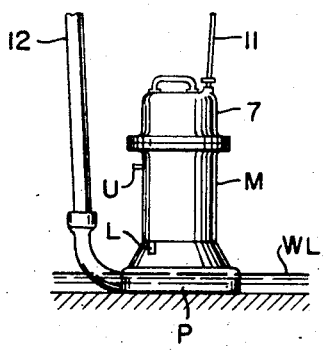
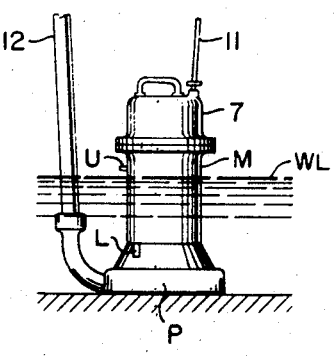
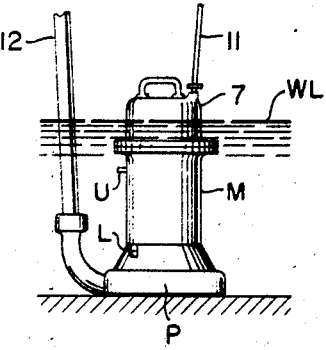
INVENTORS
*MITSUO INOUE*
*TANECHIYO MATSUZAKA*
BY
*Oberlin, Maky, Donnelly & Renner*
ATTORNEYS United States Patent Office 3,472,168
Patented Oct. 14, 1969

3,472,168
AUTOMATIC SUBMERSIBLE PUMP
Mitsuo Inoue and Tanechiyo Matsuzaka, Osaka, Japan, assignors to C.D.M. Company Ltd., Kishiwada, Osaka Prefecture, Japan, a corporation of Japan
Filed Mar. 26, 1968, Ser. No. 716,205
Claims priority, application Japan, Nov. 4, 1967, 42/93,415
Int. Cl. F04b *49/02;* F04d *15/00;* G01f *23/26*
U.S. Cl. 103—25                                          6 Claims

ABSTRACT OF THE DISCLOSURE

A water level control device for controlling the actuation of a pump and the like having vertically spaced upper and lower electrodes operatively connected to a memory and not element, respectively. An oscillating circuit utilizes the electrostatic capacity of a liquid medium surrounding the electrodes to create a sufficient current in the liquid medium to function the memory and not element for actuation of a starting relay connected to the pump motor. The memory will continue to function even though the liquid medium drops below the upper electrode so long as sufficient current is supplied through the liquid medium to the not element to cause it to continue to function. When the liquid level drops below the lower electrode, the function of the not element is interrupted, whereby the not element applies an input to the memory which disrupts the current flow to the starting relay.

Background of the invention

This invention relates to an automatic submersible pump having a water level control device which utilizes the electrostatic capacity of the water in which the pump is immersed.

An automatic submersible pump which controls its operation in response to changes in the water level by means of electrodes is already known in the art, an example being the portable automatic submersible pump disclosed in U.S. Patent No. 3,352,246, which was developed by one of the applicants of the present application. Such pump was found to be more suitable for water lifting or discharging operations in civil engineering work because of its effective performance than conventional underwater pumps equipped with float switches for water level control.

However, water level control devices of the electrode type have certain drawbacks in that its relays which are necessary for automatic operation are functioned by both of its upper and lower electrodes according to the electric conductivity of the water in which the electrodes are immersed. Whether its relays work satisfactorily or not thus depends on the resistance value of the water in which both electrodes are immersed. Consequently, in case of oil, pure water, etc. of high resistance value, the relays necessary for automatic operation would not function, or on the contrary, in case of sea water, filthy water, etc. of low resistance value, the relays would remain in holding condition letting the pump continue to operate idly.

Summary of the invention

Differing from conventional water level control devices utilizing conductivity or, in other terms, resistance value of the water in which both electrodes are immersed, the present invention relates to a water level control device which utilizes the electrostatic capacity of the water in which its electrodes are immersed for the purpose of eliminating the aforesaid defects pertaining to the control devices of the electric resistance type. The electrodes are vertically spaced apart, with the upper electrode being electrically connected to a memory and the lower electrode connected to a not element which are caused to function when the electrodes are immersed as aforesaid by an electric wave produced by an oscillating circuit to actuate a starting relay for the pump motor. The memory is of such a nature that it will remain in a holding condition despite a drop in the water level below the upper electrode so long as the water level remains above the lower electrode. However, when the water level further drops below the lower electrode, thus eliminating the input to the not element, an input will be applied to the memory by the not element due to the nature of the not element, thus breaking down the holding condition of the memory and disrupting the flow to the starting relay to stop the operation of the pump.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principles of the invention may be employed.

Brief description of the drawing

In the annexed drawing:
FIG. 1 is a sectional side view of an automatic submersible pump according to the present invention;
FIG. 2 is a wiring diagram of an automatic water level control circuit therefor; and
FIGS. 3a, 3b and 3c are schematic representations showing the automatic submersible pump according to the present invention in water of different levels.

Description of the preferred embodiment

Referring to the drawings, the symbol M in FIG. 1 indicates a motor comprising a casing 1, stator 2 and rotor 3, and P indicates a pump comprising a casing 4 and impeller 5. The impeller 5 of the pump P is mounted securely on the rotor shaft 6 of the motor M, and the casings 1 and 4 are directly coupled with each other. On the top of casing 1, a cover 7 provided with a handle 8 is mounted, and inside the cover 7 an automatic water level control device 9 is incorporated in a sealed manner forming the principal part of the present invention. The numeral 10 indicates a shaft seal, 11 a cord for power supply, and 12 a discharge pipe for the pump. On the upper and lower portions of the casing 1, an upper electrode U and a lower electrode L are arranged respectively insulated from casing 1. The above described structure has no substantial difference from an automatic submersible pump equipped with a water level control device of the electric resistance type.

Now, the automatic water level control device 9 adopted in the present invention utilizing electrostatic capacity is described in further detail; such automatic water level control device 9 having a circuit as shown in FIG. 2.

Referring to FIG. 2, the upper electrode U is electrically connected to the terminal f of a memory 18 via an amplifier 13 and rectifier 15, while the lower electrode L is connected to a terminal k of a not element 17 via an amplifier 14 and rectifier 16, the terminal m of the not element 17 being connected to the terminal g of the memory 18. Furthermore, the terminal h of the memory 18 is connected to the starting relay 19 of the motor M. Letters a and b designate power sources of the motor M which are fed by ordinary commercial voltage, whereas letters c and d denote low voltage power sources both of which are connected to the terminal point Q of an oscillating circuit 20 via the circuit itself. This terminal point Q is attached directly to the casing 1 of the pump P.

The not element 17 is of such a nature that no output is produced at its terminal m when an input is applied at its terminal k, but output is produced at the terminal m when the input is zero at the terminal k. The memory 18 is also of such a nature that an output is produced at its terminal h and it remains in a holding condition when an input takes place at its terminal f, but such holding condition breaks down when there is an input at the terminal g. Furthermore, S is a starting switch which closes the motor M breaking circuit by actuation of the relay 19.

With an automatic submersible pump of the present invention having an electric circuit formed as above described, when it is placed in a condition shown in FIG. 3a where the water level is below the lower electrode L, the upper electrode U and the lower electrode L, because of their non-short circuit condition, are not connected with each other by electrostatic capacity which is capable to generate sufficient current to function the memory 18 by means of the electric wave oscillated thereby from Q. Consequently, there will be no flow of sufficient current to function memory 18 and so the starting relay 19 of the motor M will not be actuated.

Next, considering the pump in the condition shown in FIG. 3b where the water level becomes higher, the lower electrode L is immersed in the water and there flows sufficient current by electrostatic capacity of the water to function the not element 17 by means of the electric wave oscillated from Q, then amplified by the amplifier 14 and rectified by the rectifier 16. However, by reason of the aforesaid nature of the not element 17, no output is produced at its terminal m when input takes place at its terminal k, whereby no electric current flows up to the memory 18 and consequently the relay 19 will not yet function even in this condition of the water level.

When the water level surpasses the upper electrode U as shown in FIG. 3c, the upper electrode U, lower electrode L, and terminal Q of the oscillating circuit will all be in a condition of short circuit with each other by the water of high electrostatic capacity, and accordingly a sufficient current will be generated to function the memory 18 by means of the electric wave oscillated from Q, amplified by the amplifier 13 and further rectified by the rectifier 15. Consequently, a sufficient current capable of actuating the relay 19 will flow out of the terminal h of the memory 18 and the starting switch S will be closed thereby to cause the pump to operate.

Even when the water level is changed into the condition of FIG. 3b from that of FIG. 3c as a result of the progress of water lifting operation, the current held by the memory 18 so as to flow to the relay 19 will cause the pump to continue its water lifting operation. When the water level further drops below the lower electrode L, the input hitherto produced at the terminal k of the not element 17 will vanish with output taking place at its terminal m on account of the nature of the not element 17 and input will be produced thereby at the terminal g of the memory 18. Consequently, the holding condition of the memory 18 will break down, causing the generated current to cease to flow to the relay 19 and thus the starting switch S will be opened to stop the automatic operation of the pump.

As clarified by the foregoing description, in the present invention, an automatic submersible pump is operated by the water level control device which utilizes variable electrostatic capacity of the substance existing between its electrodes and thereby it is possible to eliminate completely the defects contained in the control system by electric resistance such as mentioned at the beginning of this specification.

We therefore, particularly point out and distinctly claim as our invention:

1. A liquid level control device for controlling the actuation of a pump and the like comprising vertically spaced upper and lower electrodes, memory means having a first input terminal electrically connected to said upper electrode via an amplifier and rectifier, a second input terminal electrically connected to said lower electrode via another amplifier, a rectifier, and a not element means, and an output terminal adapted to be electrically connected to a starting relay for a pump and the like; and an oscillating circuit having a terminal electrically connected to a low voltage source via said oscillating circuit, said oscillating circuit being operative to utilize the electrostatic capacity of a liquid medium surrounding said electrodes and oscillating circuit terminal to create a sufficient current in the liquid medium to function said memory means and not element means for actuation of such starting relay, said memory means being operative to continue to function even though the liquid medium drops below said upper electrode so long as such liquid medium surrounds said lower electrode and oscillating circuit terminal for continued functioning of said not element means.

2. The liquid level control device of claim 1 wherein said memory means will continue to hold sufficient current for continued actuation of the starting relay until an input is applied to said second input terminal by said not element means upon interruption of the current flow from said oscillating circuit to said not element means by dropping of the liquid level below said lower electrode.

3. In combination, an automatic submersible pump, a motor for driving said pump, and an automatic liquid level control device for controlling the operation of said motor, said automatic liquid level control device comprising vertically spaced upper and lower electrodes, memory means having a first input terminal electrically connected to said upper electrode via an amplifier and rectifier, a second input terminal electrically connected to said lower electrode via another amplifier, rectifier, and a not element means, and an output terminal electrically connected to a starting relay for said motor; and an oscillating circuit having a terminal electrically connected to a low voltage source via said oscillating circuit, said oscillating circuit being operative to utilize the electrostatc capacity of the liquid medium when surrounding said electrodes and oscillating circuit terminal to create a sufficient current in the liquid medium to function said memory means and not element means for actuation of said starting relay and motor connected thereto, said memory means being operative to continue to function even though the liquid medium drops below said upper electrodes so long as such liquid medium surrounds said lower electrode and oscillating circuit terminal for continued functioning of said not element means, said not element means when the current is interrupted thereto being operative to disrupt the function of said memory means.

4. The combination of claim 3 wherein said memory means once functioning will continue to hold sufficient current for continued actuation of said starting relay until an input is applied to said second input terminal by said not element means upon interruption of the current flow thereto as aforesaid.

5. The combination of claim 3 wherein there is a sealed cover on said pump which contains said liquid level control device, and said pump has an outer casing to the upper and lower portions of which said upper and lower electrodes are attached, said electrodes being insulated from said casing and exposed to the outside.

6. The combination of claim 5 wherein said oscillating circuit terminal is directly connected to said pump casing.

References Cited

UNITED STATES PATENTS

| | | | |
|---|---|---|---|
| 2,884,948 | 5/1959 | Weiss | 137—392 |
| 2,968,573 | 1/1961 | Mesh. | |
| 3,252,420 | 5/1966 | Sorensen. | |
| 3,272,991 | 9/1966 | Lutsch et al. | |
| 3,338,261 | 8/1967 | Bergeson et al. | |
| 3,376,746 | 4/1968 | Roberts. | |

WILLIAM L. FREEH, Primary Examiner

U.S. Cl. X.R.

73—304; 137—392